Patented July 23, 1946

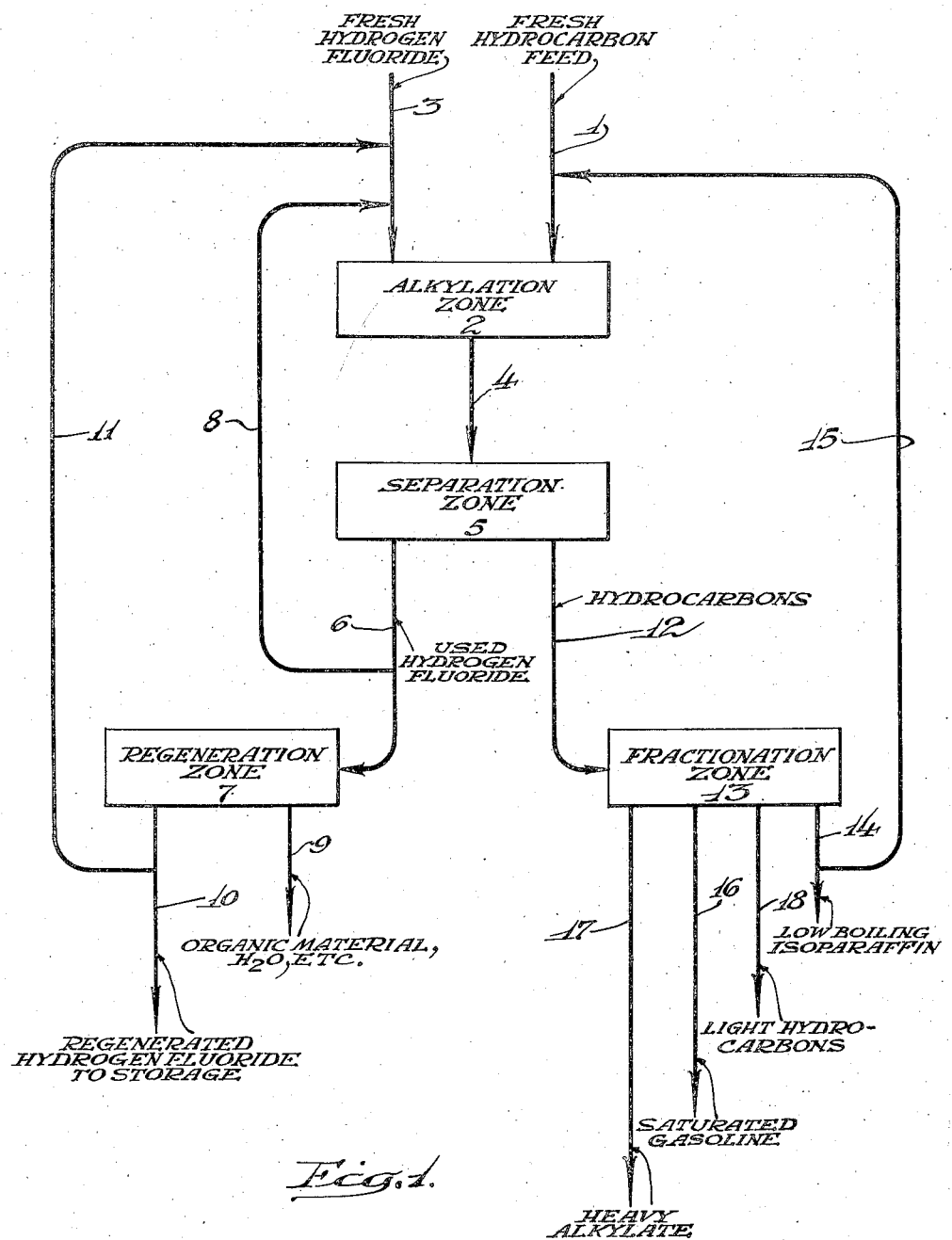

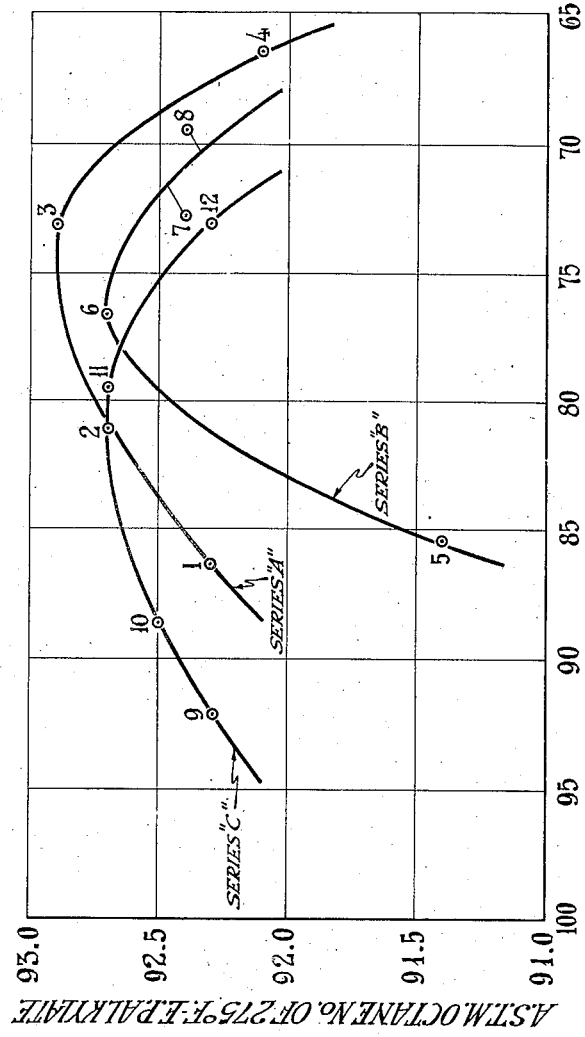

2,404,393

UNITED STATES PATENT OFFICE 2,404,393

ALKYLATION OF PARAFFIN HYDROCARBONS

Harrison C. Mayland, Chicago, Ill., assignor to Universal Oil Products Company, Chicago, Ill., a corporation of Delaware Application July 24, 1942, Serial No. 452,122

6 Claims. (Cl. 260—683.4)

This invention relates to the alkylation of hydrocarbons in the presence of a hydrogen fluoride catalyst.

It is more particularly concerned with an improved process for the production of higher molecular weight isoparaffins by the alkylation of lower boiling isoparaffins with olefins in the presence of a hydrogen fluoride catalyst wherein the concentration of hydrogen fluoride is controlled within a preferred range in order to obtain the optimum product quality.

The production of higher molecular weight isoparaffins having valuable anti-knock properties and therefore suitable for use in aviation fuels is of considerable importance in the refining industry. A convenient source of such hydrocarbons is the catalytic alkylation of low boiling isoparaffins such as isobutane and isopentane with normally gaseous olefins such as propylene and the butylenes. Large quantities of these hydrocarbons are available from the cracking of petroleum oils and from the natural gasoline industry.

The alkylation of isoparaffins utilizing a liquid catalyst, such as hydrogen fluoride, is ordinarily conducted by introducing the hydrocarbon charging stock and catalyst into a mechanically agitated reaction zone or any reaction zone suitable for effecting intimate contact between the hydrocarbons and catalyst. The hydrocarbon-catalyst mixture is maintained at the desired temperature, pressure, and time of contact, and it is preferable that a substantial molecular excess of isoparaffins over olefins be maintained throughout the entire reaction. The reaction mixture is withdrawn and is introduced into a separation zone which ordinarily will comprise a settler. The lower used catalyst layer is recycled from the settler to the reaction zone, a portion thereof being preferably withdrawn from the system and introduced into a catalyst regeneration zone. The upper hydrocarbon layer from the settler is subjected to fractionation for the recovery of gasoline boiling range products and for the separation of unconverted isoparaffins which may be recycled to the reaction zone.

When hydrogen fluoride catalysts are used to effect alkylation, certain organic materials are formed in addition to the alkylation products of the reaction which tend to accumulate in the catalyst phase and which serve effectively as organic diluents for the catalyst. The nature of the organic diluent formed in the alkylation reaction is not known clearly, but it is believed that in some cases at least higher molecular weight alkyl fluorides, particularly those having 6 or more carbon atoms per molecule, are present as well as higher molecular weight polymers and organic fluorine-containing complexes.

As the alkylation reaction is conducted continuously with recycling of the separated used catalyst, a substantial portion of the organic diluent formed remains dissolved or dispersed in the catalyst phase and is therefore continuously recycled within the system. It is thus possible for the organic diluent content of the catalyst to build up with continued use and the effective hydrogen fluoride concentration is thereby reduced.

My invention contemplates controlling the accumulation of organic diluent in the catalyst phase by any convenient method of control whereby to contain the effective hydrogen fluoride concentration within the most desirable range as hereinafter described. One method of controlling the accumulation of organic diluent comprises withdrawing a portion of the used catalyst from the system and replacing it with relatively uncontaminated catalyst such as fresh hydrogen fluoride or regenerated catalyst having a higher effective concentration of hydrogen fluoride.

Although under some alkylation conditions using a mineral acid catalyst such as sulfuric acid or hydrogen fluoride, it is desirable to maintain the acid concentration as high as possible, e. g., by utilizing the highest acid replacement rate that is economically feasible, I have now found that good results may be obtained at relatively low acid concentrations when using a hydrogen fluoride catalyst. I have further discovered that in many cases improved results may be obtained by controlling the hydrogen fluoride dilution within a relatively critical range wherein the optimum quality of alkylation products is obtained.

In one specific embodiment my invention comprises an improvement in the alkylation of isoparaffins with olefins in the presence of a hydrogen fluoride catalyst wherein the hydrocarbon reaction products are separated from the used catalyst, said separated hydrocarbon reaction products are subjected to fractionation, at least a portion of said used catalyst is returned to the alkylation zone, and used catalyst is withdrawn from the system and replaced with catalyst having a higher effective concentration of hydrogen fluoride, said improvement comprising the step of controlling the withdrawal of used catalyst and the addition of more concentrated hydrogen fluoride whereby to maintain the concentration of hydrogen fluoride in the catalyst phase within the range wherein alkylation products of optimum quality are obtained.

In Fig. 1 is shown a schematic flow diagram of the type of alkylation process to which my invention is related.

Fig. 2 illustrates graphically the limitations on the useful degree of the dilution of the catalyst phase.

Referring to Fig. 1, a fresh hydrocarbon feed comprising a paraffin-olefin mixture wherein isoparaffins are preferably present in substantial molar excess over the olefins is introduced through line 1 into alkylation zone 2. This zone may comprise any convenient arrangement of equipment or apparatus capable of effecting intimate contacting of the hydrocarbon reactants and catalyst. A fresh liquid hydrogen fluoride catalyst is introduced through line 3. Alkylation zone 2 is preferably operated at a pressure such that the catalyst and hydrocarbons are maintained substantially in the liquid phase.

The reaction mixture passes through line 4 into separation zone 5 which may conveniently comprise a settling zone. Used hydrogen fluoride catalyst is removed through line 6 and introduced in part into regeneration zone 7. A substantial portion of the used hydrogen fluoride catalyst removed through line 6 is recycled by means of line 8 to the alkylation zone 2. Regeneration zone 7 may comprise any effective means, e. g., a heating or distillation zone, whereby purified hydrogen fluoride may be separated from the organic contaminants present in the used catalyst. Water may also be removed from the used acid in this zone. The regenerated acid is then withdrawn to storage through line 10 or may be recycled through line 11 to the alkylation zone. The organic contaminants or residual material which remain after the recovery of purified hydrogen fluoride from the used catalyst are withdrawn from the regeneration zone through line 9.

The separated hydrocarbon phase passes from zone 5 by means of line 12 into fractionation zone 13. Light hydrocarbon gases of the process are recovered through line 18. A low boiling unconverted isoparaffin stream such as isobutane may be recovered through line 14 and is preferably recycled by means of line 15 to alkylation zone 2. Saturated gasoline boiling range hydrocarbons are removed through line 16, and the higher boiling hydrocarbon reaction products are recovered through line 17.

By the term "hydrogen fluoride catalyst" which is used throughout this specification and appended claims, it is intended to include catalysts wherein hydrogen fluoride is the essential active ingredient. Thus it is within the scope of my invention to employ catalysts containing relatively minor amounts of other materials in addition to hydrogen fluoride. For example, the hydrogen fluoride catalyst may contain minor quantities of water. While ordinarily commercial "anhydrous" hydrogen fluoride will be charged to the alkylation system, it is possible to have as high as about 10 to 15% water present in the catalyst. Excessive dilution with water, however, is undesirable since it tends to reduce the alkylating activity of the catalyst. Other substances such as boron trifluoride which may promote the catalytic activity of hydrogen fluoride in alkylation reactions may also be present.

The alkylation of isoparaffins with olefins in the presence of a hydrogen fluoride catalyst may be conducted at a temperature of from about 0° F., to about 200° F., although the reaction temperature is preferably and more conveniently held within the range of from about 50° F., to about 150° F. The pressure on the alkylation system is ordinarily just high enough to insure that the hydrocarbons and catalyst are substantially in the liquid phase. The reaction may be subjected to further control by means of the space time which is defined as the volume of catalyst within the contacting zone divided by the volume rate per minute of hydrocarbon reactants charged to the zone. Usually the space time will lie within the range of from about 5 to about 80 minutes, although this range may in certain cases be extended in either direction. It is preferable to maintain at all times a substantial molar excess of isoparaffins over olefins in the alkylation zone, e. g., from 4:1 to 10:1 or higher.

The alkylation of isoparaffins with olefins utilizing hydrogen fluoride catalysts is particularly important in the case of the alkylation of isobutane with normally gaseous olefins such as propylene or butylene which are readily available in substantial quantities from ordinary refining sources. However, the process may also be applied to normally liquid isoparaffins and normally liquid olefins. It is also possible to employ mixtures of the normally liquid and normally gaseous hydrocarbons as reactants.

The term "crude alkylate" as used in this specification is intended to designate the total stabilized hydrocarbon reaction products of the process and it thus includes not only the aviation gasoline fraction but also the higher boiling products of the reaction.

To illustrate more definitely the nature of my invention I now refer to the following table which includes experimental data obtained in twelve alkylation runs using a substantially anhydrous hydrogen fluoride catalyst and a hydrocarbon charging stock having the following approximate molal composition: 4% isobutylene, 9% n-butylenes, 70% isobutane, 16% n-butane, 1% $C_5$ and heavier. The apparatus used was arranged in substantially the same manner as shown in Fig. 1, and comprised essentially a mechanically agitated reaction zone of the turbo-mixer type, means for charging fresh hydrogen fluoride and hydrocarbon reactants thereto, a settling zone for the separation of used catalyst from the hydrocarbon reaction products, a fractionation zone for fractionating said hydrocarbon reaction products, means for recycling the used catalyst from the settling zone to the reaction zone, and means for withdrawing a portion of the used catalyst from the system.

|  | Run No. | | | | | | | | | | | |
|---|---|---|---|---|---|---|---|---|---|---|---|---|
|  | 1 | 2 | 3 | 4 | 5 | 6 | 7 | 8 | 9 | 10 | 11 | 12 |
| Series | A | | | | B | | | | C | | | |
| Charging stock: | | | | | | | | | | | | |
| $C_3$ | 0.0 | | | | 1.7 | | | | 1.3 | | | |
| $i$-$C_4H_8$ | 4.1 | | | | 3.8 | | | | 4.1 | | | |
| $n$-$C_4H_8$ | 9.3 | | | | 9.1 | | | | 8.7 | | | |
| $i$-$C_4H_{10}$ | 70.0 | | | | 69.3 | | | | 69.7 | | | |
| $n$-$C_4H_{10}$ | 15.9 | | | | 15.3 | | | | 15.6 | | | |
| $C_5+$ | 0.7 | | | | 0.8 | | | | 0.6 | | | |
| $i$-Paraffin/olefin ratio | 5.2 | | | | 5.1 | | | | 5.3 | | | |
| Conditions: | | | | | | | | | | | | |
| Space time, min | 36 | 35 | 36 | 36 | 61 | 54 | 53 | 50 | 9 | 11 | 12 | 11 |
| Press., p. s. i. gage | 100 | | | | 150 | | | | 50 | | | |
| Temp., °F | | | | | | | | | | | | |
| Vol. ratio, catalyst/hydrocarbon, in reaction zone | 1.1 | 1.2 | 1.0 | 1.1 | 1.4 | 1.0 | 1.1 | 1.0 | 0.9 | 1.2 | 1.4 | 1.2 |
| Catalyst withdrawal rate, cc./hr | 12.1 | 8.4 | 3.1 | 1.2 | 2.4 | 1.9 | 1.1 | 0.9 | 96.6 | 41.4 | 13.3 | 9.5 |
| Catalyst addition rate, cc./hr | 20.0 | 6.0 | 5.5 | 3.3 | 7.2 | 4.0 | 3.0 | 3.0 | 102.0 | 48.0 | 16.0 | 11.0 |
| R. P. M. of agitator in contacting zone | 1750 | | | | | | | | 3500 | | | |
| Analysis of catalyst phase: | | | | | | | | | | | | |
| Total titratable acidity, wt. per cent | 86.3 | 81.1 | 73.2 | 66.6 | 85.3 | 76.7 | 72.9 | 69.4 | 92.1 | 88.7 | 79.5 | 73.1 |
| Water, wt. per cent | 2.6 | 2.0 | 1.9 | 4.0 | 2.7 | 1.0 | 1.1 | 1.1 | 1.2 | 1.2 | 1.2 | 1.2 |
| Organic diluent, wt. per cent | 11.1 | 16.9 | 24.9 | 29.4 | 12.0 | 22.3 | 26.0 | 29.5 | 6.7 | 10.1 | 19.3 | 25.7 |
| Results: | | | | | | | | | | | | |
| A. S. T. M. octane No. of 275° F. E. P. alkylate | 92.3 | 92.7 | 92.9 | 92.1 | 91.4 | 92.7 | 92.4 | 92.4 | 92.3 | 92.5 | 92.7 | 92.3 |
| Vol. crude alkylate/vol. catalyst withdrawn | 22 | 30 | 84 | 198 | 60 | 91 | 162 | 176 | 7 | 18 | 56 | 66 |
| Vol. 275° F. E. P. alkylate/vol. catalyst withdrawn | 20 | 27 | 75 | 171 | 54 | 82 | 144 | 153 | 7 | 17 | 51 | 58 |
| Bromine No. of crude alkylate | 0.1 | 0.1 | 0.1 | 0.2 | 0.1 | 0.1 | 0.2 | 0.1 | 0.1 | 0.1 | 0.1 | |

Series A comprising runs 1, 2, 3 and 4 was made at 100° F., 36 minutes space time and 1750 R. P. M. on the mechanical agitator in the reaction zone. In series B comprising runs 5, 6, 7 and 8 the space time was increased to an average value of about 55 minutes with all other conditions the same. Series C comprising runs 9, 10, 11 and 12 was made at 50° F., an average space time of about 11 minutes, and 3500 R. P. M. on the mechanical agitator. The four tests in each series were made at decreasing values of total titratable acidity in the catalyst phase in order to illustrate the effect of the hydrogen fluoride concentration under each set of conditions.

It can be seen by examining the data for each series that as the total titratable acidity of the catalyst phase in the reaction system decreases, the volume of crude alkylate produced per volume of used catalyst withdrawn from the system increases markedly. Substantially the same effect is noted in terms of volumes of 275° F., E. P. alkylate produced per volume of used catalyst withdrawn from the system. It is apparent, then, that a considerable economic advantage accrues by operating at a relatively low titratable acidity since the quantity of desired product obtained at a given hydrogen fluoride replacement rate or a given hydrogen fluoride regeneration cost is substantially improved.

However, I have found as a result of experimental tests that there are limitations on the useful degree of the dilution of the catalyst phase since with too great a dilution the quality of the product is adversely affected. This fact is illustrated in Fig. 2 wherein the weight per cent total acidity of the catalyst phase has been plotted against the A. S. T. M. octane number of the 275° F., E. P. alkylate product for all three series. It will be seen that for each of the three series there is a definite optimum range of total acidity wherein the highest octane number product is obtained.

It is not possible to establish definitely a relatively narrow range of total acidity which will give optimum results in all cases. The exact optimum range for any case may depend to a considerable extent on the other process variables such as space time, temperature, composition of the fresh charging stock and the combined feed, degree of mixing of reactants and catalyst, water content of the catalyst, etc. The effect on the location of the optimum acidity range caused by changing other process variables may be illustrated by comparing the curves for series A and B which were made at space times of 36 and 55 minutes, respectively. The major effect under the conditions of the two series was merely a general decrease in the octane number level of the product, as the space time was increased over the range of 36 to 55 minutes. However, in the case of series C the space time was decreased, the temperature was decreased, and the degree of mixing (as a function of the agitator speed) was increased with the net result that the optimum range of total acidity was definitely displaced in the direction of higher hydrogen fluoride concentrations. In practical terms this means a higher regeneration rate or catalyst replacement rate is required.

While it is thus not possible to establish the optimum range of total acidity which is applicable in all cases, it has been found that for many cases, e. g., when alkylating isobutane with propylene, butylenes, or amylenes, the desirable total acidity will fall within the broader range of from about 65 to about 95%. Moreover, when isobutane is alkylated with normally gaseous olefins in the presence of a hydrogen fluoride catalyst under substantially liquid phase conditions and at temperatures of from about 50° F., to about 100° F., or slightly higher, the optimum octane number products will be obtained at a total acidity within the range of from about 70 to about 85%.

It should be noted that the titratable acidity of the catalyst phase within the reaction system is an effective measure of the free hydrogen fluoride concentration. However, it is not necessarily a true measure of the catalytic activity of the catalyst phase unless the complete composition of the phase is known. From the data obtained in these runs, it will be seen that the dilution of the hydrogen fluoride was accomplished largely by the accumulation of organic diluent during the alkylation reaction. If the same effective dilution of the hydrogen fluoride were obtained by the addition of water, the catalyst activity would not necessarily be the same. While in most instances the hydrogen fluoride charged to the alkylation process will be of the commercially "anhydrous" variety which contains several per cent of water, under certain conditions somewhat larger amounts of water may be present as hereinbefore described. This, of course, may effect the location of the critical range of total acidity. Previous experience has shown that hydrogen fluoride diminishes greatly in its alkylation activity if more than from about 10% to about 15% water is present. From the data presented here it is evident that substantially larger amounts of organic diluent formed during the alkylation reaction may be present in many cases without an adverse effect on the catalyst activity.

Although the mechanism of the effect of controlled amounts of organic diluent in the catalyst phase is not entirely clear it appears that the catalyst activity is altered by the presence of the organic material to such an extent that undesirable side reactions are repressed resulting in improved quality of the alkylation products, said improved quality being evidenced, for example, by the relatively high octane number. It is not intended, however, that the scope of my invention be limited in any way by this explanation of the effect of the organic diluent.

From experimental observations I have shown that unexpected results may be obtained in the alkylation of isoparaffins with olefins using a hydrogen fluoride catalyst of relatively high organic diluent content. This is contrary to previous experience with mineral acid alkylation catalysts, since it would ordinarily be expected that the product quality would decline continuously with increasing contamination of the catalyst. I have not only shown that good results can be obtained with hydrogen fluoride catalysts of relatively low titratable acidities but that under any given set of processing conditions there is also a relatively critical range of total acidity which must not be exceeded if products of optimum quality are to be obtained.

I claim as my invention:

1. An alkylation process which comprises reacting an isoparaffin with an olefin in the presence of a substantially anhydrous hydrogen fluoride catalyst, thereby forming a catalyst phase containing organic diluent of higher molecular weight than the alkylated isoparaffin, and controlling the accumulation of said organic diluent in the catalyst phase to maintain the hydrogen fluoride concentration of the catalyst phase within the range of from about 70 to about 85 weight percent.

2. An alkylation process which comprises reacting an isoparaffin with an olefin in the presence of a substantially anhydrous hydrogen fluoride catalyst, thereby forming a catalyst phase containing organic diluent of higher molecular weight than the alkylated isoparaffin, withdrawing used catalyst from and adding more concentrated hydrogen fluoride to the alkylating step, and, by regulation of said catalyst withdrawal and addition, controlling the accumulation of said organic diluent in the catalyst phase to maintain the hydrogen fluoride concentration of the catalyst phase within the range of from about 70 to about 85 weight percent.

3. The process as defined in claim 2 further characterized in that the withdrawn used catalyst is regenerated to separate hydrogen fluoride from organic diluent and the former returned to the alkylating step as at least a portion of said more concentrated hydrogen fluoride.

4. An alkylation process which comprises reacting isobutane with a normally gaseous olefin at a temperature of from about 50° F. to about 100° F. in the presence of a substantially anhydrous hydrogen fluoride catalyst, thereby forming a catalyst phase containing organic diluent of higher molecular weight than the alkylated isobutane, and controlling the accumulation of said organic diluent in the catalyst phase to maintain the titratable acidity of the catalyst phase within the range of from about 70 to about 85 weight percent.

5. An alkylation process which comprises reacting isobutane with a normally gaseous olefin at a temperature of from about 50° F. to about 100° F. in the presence of a substantially anhydrous hydrogen fluoride catalyst, thereby forming a catalyst phase containing organic diluent of higher molecular weight than the alkylated isobutane, withdrawing used catalyst from and adding more concentrated hydrogen fluoride to the alkylating step, and, by regulation of said catalyst withdrawal and addition, controlling the accumulation of said organic diluent in the catalyst phase to maintain the titratable acidity of the catalyst phase within the range of from about 70 to about 85 weight percent.

6. The process as defined in claim 5 further characterized in that the withdrawn used catalyst is regenerated to separate hydrogen fluoride from organic diluent and the former returned to the alkylating step as at least a portion of said more concentrated hydrogen fluoride.

HARRISON C. MAYLAND.